(12) United States Patent
Lee et al.

(10) Patent No.: US 7,091,456 B2
(45) Date of Patent: Aug. 15, 2006

(54) AIRCRAFT HOT WATER SUPPLY SYSTEM

(75) Inventors: Charles A. Lee, Akron, OH (US);
Michael J. Giamati, Akron, OH (US);
Carl R. Aeschliman, Rittman, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 10/960,241

(22) Filed: Oct. 7, 2004

(65) Prior Publication Data
US 2005/0109763 A1 May 26, 2005

Related U.S. Application Data

(60) Provisional application No. 60/509,365, filed on Oct. 7, 2003.

(51) Int. Cl.
*A05B 1/02* (2006.01)
(52) U.S. Cl. ............ 219/483; 219/486; 392/396; 307/40
(58) Field of Classification Search ........... 219/483, 219/484, 485, 486, 501, 497, 505; 392/396–398, 392/480, 486; 307/38–41
See application file for complete search history.

(56) References Cited

U.S. PATENT DOCUMENTS

| | | | |
|---|---|---|---|
| 2,786,211 A | 3/1957 | Culver, Jr. ............ 4/187 |
| 4,106,013 A * | 8/1978 | Cronin ............ 340/971 |
| 4,160,153 A * | 7/1979 | Melander ............ 219/485 |
| 4,168,491 A * | 9/1979 | Phillips et al. ............ 340/501 |
| 4,771,762 A | 9/1988 | Bridegum ............ 126/360 |
| 4,884,725 A | 12/1989 | Ahad et al. ............ 222/639 |
| 5,032,290 A | 7/1991 | Yamagata et al. ............ 210/747 |
| 5,261,440 A | 11/1993 | Frank ............ 137/209 |
| 5,303,739 A * | 4/1994 | Ellgoth et al. ............ 137/899.2 |
| 5,309,938 A | 5/1994 | Ellgoth et al. ............ 137/334 |
| 5,622,207 A | 4/1997 | Frank ............ 137/899.2 |
| 5,769,124 A | 6/1998 | Ehrhardt ............ 137/625.47 |
| 6,463,956 B1 | 10/2002 | Walker ............ 137/563 |
| 6,766,822 B1 | 7/2004 | Walker ............ 137/365 |
| 2003/0021597 A1 * | 1/2003 | Chu ............ 392/486 |

FOREIGN PATENT DOCUMENTS

JP 411094279 A * 4/1999

* cited by examiner

*Primary Examiner*—Mark Paschall
(74) *Attorney, Agent, or Firm*—Renner, Otto, Boisselle & Sklar, LLP

(57) ABSTRACT

An aircraft hot water supply system (10) comprising a group of water-use stations (14a–14f) each including a hot water line having a heater (40a–40f) which heats water at a heating rate dependent upon power provided thereto. A power manager (44) allocates different non-zero percentages of heater-dedicated power to different heaters (40) depending upon conditions at the corresponding water-use stations (14). A network (46) is provided to establish peer-to-peer communication among the heaters' controllers (48a–48f).

28 Claims, 3 Drawing Sheets

AIRCRAFT HOT WATER SUPPLY SYSTEM

RELATED APPLICATION

This application claims priority under 35 U.S.C. §119(e) to U.S. Provisional Patent Application No. 60/509,365 filed on Oct. 7, 2003 and entitled AIRCRAFT ELECTRICAL HEATING MANAGEMENT. The entire disclosure of this provisional application is hereby incorporated by reference.

FIELD OF THE INVENTION

This invention relates generally, as indicated, to an aircraft hot water supply system and, more particularly, to an aircraft hot water supply system wherein hot water is supplied to a plurality of water-use stations.

BACKGROUND OF THE INVENTION

An aircraft commonly includes a water supply system in order to provide on-board water-use stations with fresh water. Such a system can comprise a water source line capable of continuously supplying water at a supply temperature (e.g., a temperature at least warm enough to prevent freezing) and a plurality of water-use stations. Certain water-use stations, such as hand wash basins in lavatories and sinks in galleys, have a hot water line and a cold water line. The stations can each incorporate a faucet assembly which mixes the water from the hot and cold water lines for discharge through a spout. The faucet assembly can include handle/valve means to manually control the discharge time and to adjust the temperature and flow rate of the discharged water.

The hot water line of each water-use station will commonly include a local heater to heat the relatively cold water from the water supply to a hot temperature (e.g., about 45° C.). The heater heats the water at a certain heating rate (e.g., kg*∆C°/s) dependent upon the power provided thereto. For example, a heater operating at 400 watts will take about twice as long as a heater operating at 800 watts to heat a kilogram of water a given number of temperature degrees. Likewise, a heater operating at 800 watts will heat about twice as much water as a heater operating at 400 watts in a given amount of time.

Typically, a plurality of heaters (e.g., six heaters) are grouped together and powered by a single power source. Conventionally, each heater consistently used a set amount of power (e.g., 400 watts) to heat the water thereby always heating water at a corresponding heating rate. The power source was selected (and/or the heaters were selected and/or grouped) so that enough power (e.g., 2400 watts) was available for all of the grouped heaters to be operated at the same time.

SUMMARY OF THE INVENTION

The present invention provides a power manager that allocates different percentages of available power to aircraft hot water heaters depending upon conditions at the respective water-use stations.

More particularly, the present invention provides an aircraft hot water supply system comprising a group of water-use stations each including a hot water line having a heater which heats water at a heating rate dependent upon the power provided thereto. A power manager allocates different non-zero percentages of heater-dedicated power to the different heaters depending upon real-time conditions at the corresponding water-use stations. The heaters will heat the water at different heating rates based upon this allocation whereby the heater-dedicated power will not necessarily be evenly divided among the heaters through the course of the flight.

This method of operation is viable on an aircraft because usage patterns will typically not call for hot water from all of the stations at the same time. Therefore, while one or more heaters are idling, the other heaters can make use of the unused heater-dedicated power. Additionally, the power manager of the present invention allows periodic high-power heating (e.g., 1200 watt or 1600 watt operation) in heavy water draw situations thereby substantially reducing heater recovery time. Prior to the present invention, it was believed to be impossible (or at least impractical) to accommodate such high-power operation of hot water heaters in an aircraft environment.

DRAWINGS

DETAILED DESCRIPTION

Figure 1:
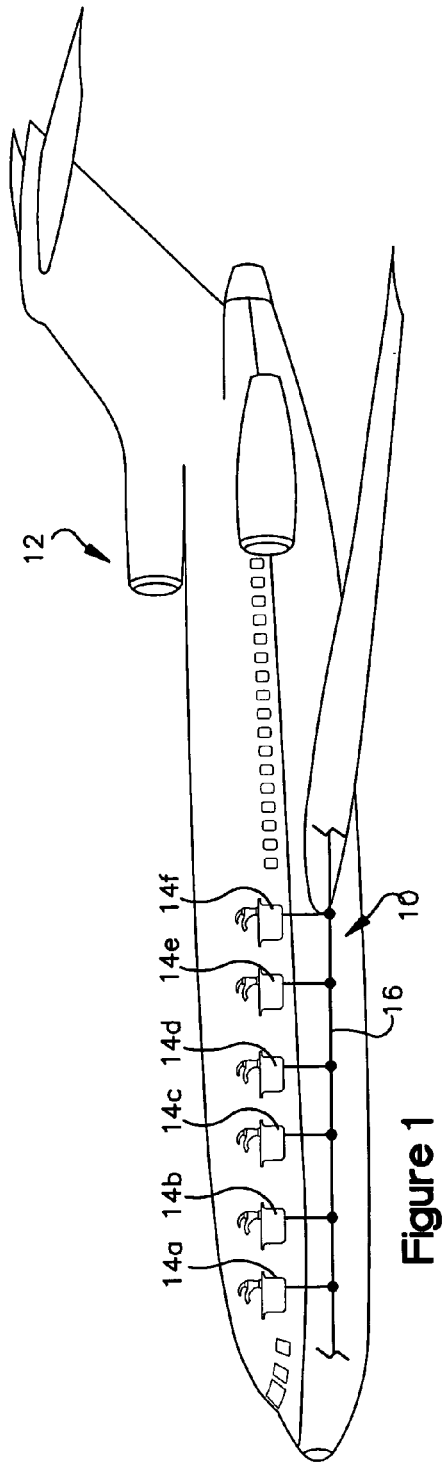
FIG. 1 is a schematic view of an aircraft with a hot water supply system according to the present invention, the hot water supply system including a plurality of water-use stations.

Referring now to the drawings, and initially to FIG. 1, an aircraft hot water supply system 10 according to the present invention is shown in an aircraft 12. The supply system 10 comprises a group (or plurality) of water-use stations 14a–14f and a water supply 16 capable of supplying water to each of the water-use stations 14. The water-use stations 14 can comprise lavatory hand wash basins, galley sinks, or any other devices for discharging hot water. In an aircraft, such as the aircraft 12, the water-use stations 14a–14f will typically not all be used at the same time and, when used, will probably discharge differing amounts of water. Additionally or alternatively, some of the water-use stations 14 might be in colder aircraft areas than other water-use stations 14.

Figure 2:
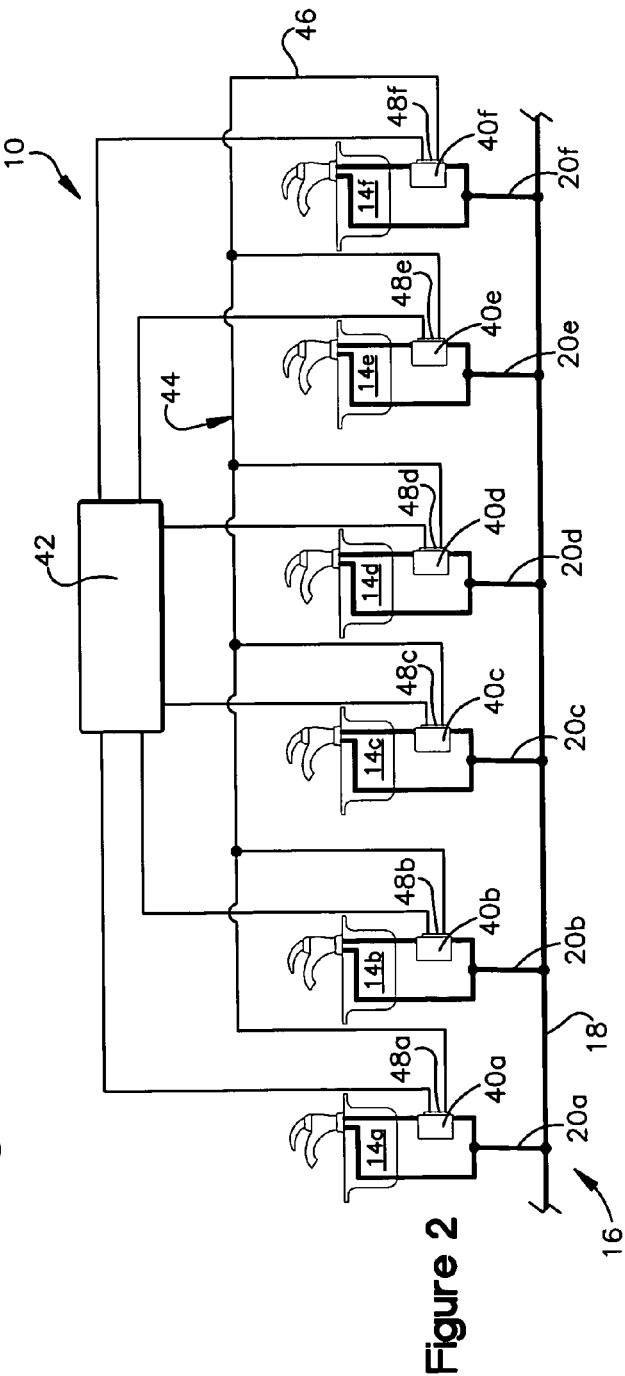
FIG. 2 is a schematic view of the hot water supply system isolated from the rest of the aircraft.

Referring now to FIG. 2, the system 10 is shown isolated from the rest of the aircraft 12. The water supply 16 can comprise a water tank or other source (not shown) which holds a sufficient amount of water to supply it on demand to the stations 14. For ease in explanation, the illustrated water supply 16 is shown as comprising a single main line 18 with a tap line 20a–20f for each of the water-use stations 14. However, the water supply 16 could instead comprise a combination of several main lines, pipes, conduits which are fed by the same or different sources. In any event, the water supply 16 will normally be designed to keep water at a temperature safely above freezing (e.g., 5° C.) and, to this end, may incorporate heaters in certain plumbing areas. As such, different water-use stations 14 might receive supply water at slightly different temperatures depending upon a particular station's location relative to the heating arrangement of the water supply 16.

Figure 3:
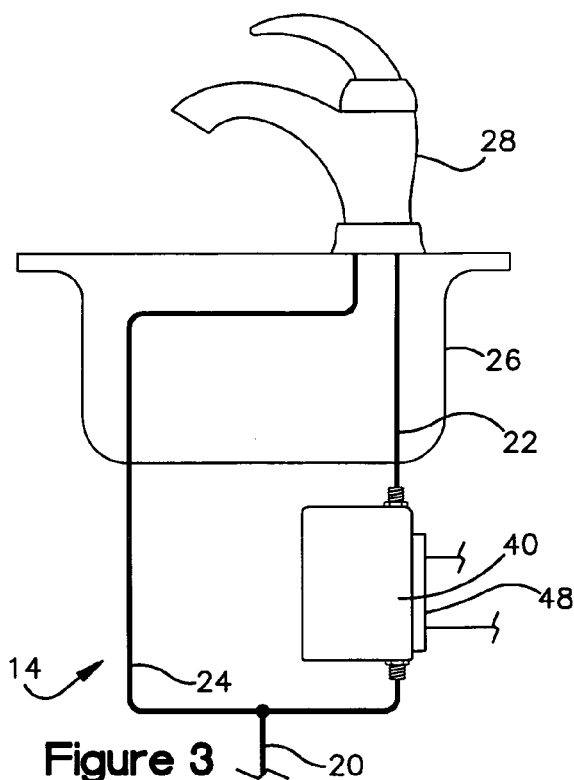
FIG. 3 is a close-up schematic view of one of the water-use stations and associated plumbing.

Referring now to FIG. 3, one of the water-use stations 14 and associated supply plumbing are shown in detail. The illustrated station 14 includes a hot water line 22 and a cold water line 24 which are teed from the tap line 20. (It is noted that the cold water line 24 might not be used in certain situations, such as when the water-use station is intended to discharge only heated water.) The station 14 can incorporate a faucet assembly 28 which mixes the water from the lines 22/24 for discharge through a spout. Handle/valve means (not shown) can be provided to manually control discharge time, temperature and flow rate of the water.

Each hot water line 22 includes a heater 40 to heat the water from the supply 16 to a desired hot temperature (e.g., about 45° C.). Each heater 40 heats the water at a heating rate (e.g., kg*$\Delta$C°/s) dependent upon the power provided thereto. Thus, if 400 watts of power are supplied to the heater, it will take about twice as long as when 800 watts of power are supplied thereto, to heat a kilogram of water a given number of temperature degrees. Likewise, if 800 watts of power are supplied to the heater, it will heat about twice as much water, as when 400 watts of power are supplied thereto, in a given amount of time.

Referring now back to FIG. 2, the group of heaters 40a–40f are shown as being powered by a single on-board power source 42. In the illustrated embodiment, the power source 42 provides power only to the heaters 40a–40f and all of the heaters 40 are designed to operate at varying heating rates. The power source 42 could be capable of continuously supplying a certain amount of power (e.g., 2400 watts) exclusively to the group of heaters whereby the aircraft's heater-dedicated power would be a predetermined set amount. However, a single power source and/or multiple power sources that also power other aircraft components (including water heaters designed to operate at a constant heating rate) could instead or additionally contribute heater-dedicated power. If heater power is provided from sources that also supply more crucial aircraft equipment, heater-dedicated power could fluctuate throughout the flight if, for example, this equipment's power use is periodic and/or overrides the heaters' power needs.

According to the present invention, the aircraft hot water supply system 10 includes a power manager 44 that allocates different percentages of heater-dedicated power to the respective heaters 40a–40f depending upon conditions at the corresponding water-use stations 16a–16f. Specifically, the power manager 44 allows substantially real-time evaluation of the heating needs of each of the heaters 40. Based upon this evaluation, the manager 44 accordingly distributes the heater-dedicated power among the heaters 14.

The distribution of the heater-dedicated power can be based upon programmed protocols. For example, if the illustrated six-heater water system 10 has a set budget of heater-dedicated power (e.g., 2400 watts), the protocol could be that each heater 40 will always be provided at least its fraction of this power (e.g., 400 watts). Greater percentages of power could be provided to individual heaters 40 only when available (e.g., one or more idling heaters) and greater power loads would be immediately reduced upon an idling heater 40 requiring its fraction of heater-dedicated power. Power allocations could be alternatively or additionally prioritized by certain thermal conditions (e.g., lowest water temperature takes precedent) and/or non-thermal conditions (e.g., first class stations trump coach stations).

In the illustrated embodiment, the manager 44 comprises a network 46 and controllers 48a–48f for the heaters 40a–40f, respectively. Each controller 48 determines, in substantially real time, the thermal conditions at its respective heater 40. The network 46 establishes peer-to-peer communication among the controllers 48 so that each controller is aware of the power being used (or needed) by each of the other heaters 40. Alternatively, the controllers 48a–48f could be replaced with a single supervisory controller which determines the thermal conditions at each heater 40 and the network 46 could establish supervisor-to-peer communication between the controller and the heaters 40. In either case, the power manager 44 determines and executes the protocol-appropriate distribution of the heater-dedicated power based on real-time conditions at the water-use stations 14.

Figure 4:
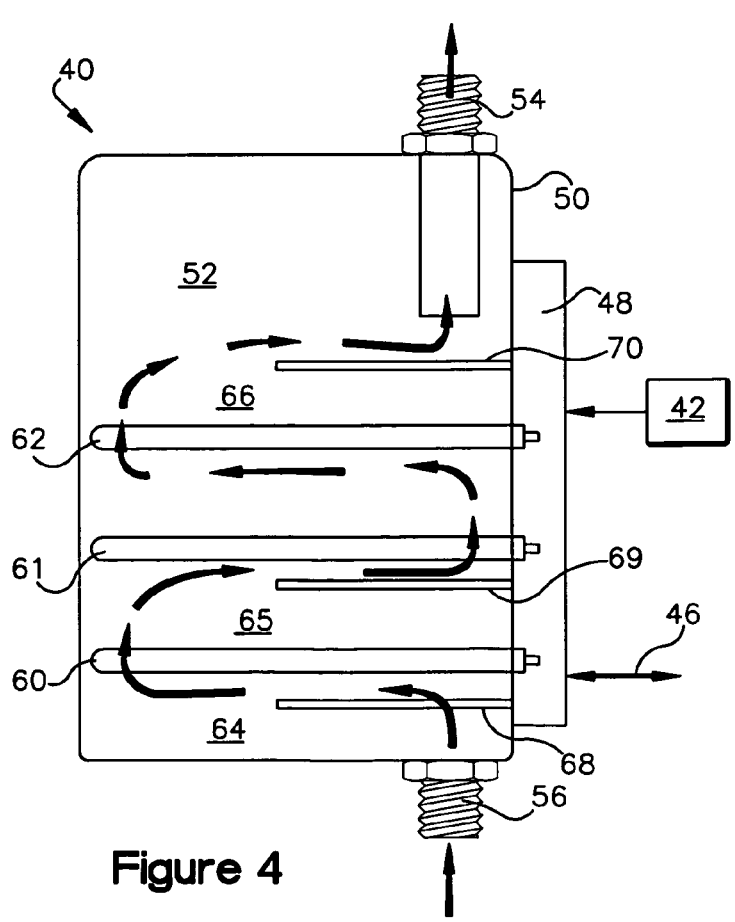
FIG. 4 is a side view of a heater which can be used in the hot water supply system according to the present invention.

Referring now to FIG. 4, the heater 40 is shown isolated from the water-use station 14 and the rest of the hot water line 22. The heater 40 comprises a housing 50 defining a chamber 52 whereat a certain volume of water is heated and stored in anticipation of use at the corresponding station 14. The housing 50 includes an outlet 54 through which hot water exits the chamber 52 upon activation of the water-use station 14 and an inlet 56 through which supply water enters the chamber 52 to replace the removed hot water. Thus, the more hot water drawn at the station 14, the more supply water will be introduced into the chamber 52.

The heater 40 includes three heating elements 60, 61 and 62, each of which is designed to operate at a given power level (e.g., 400 watts). In the illustrated heater 40, the heating elements 60–62 are incorporated into horizontal baffle plates positioned at different levels in the housing 50 to provide an efficient water flow pattern through the chamber 52. The heating elements 60–62 divide the chamber 52 into a first (lower) zone 64, a second (middle) zone 65, and a third (upper) zone 66. The temperature of water in each zone is measured by corresponding sensors 68, 69 and 70.

In operation of the heater 40, power (e.g., 400 watts) can be supplied to one, two, or all of the heating elements 60–62. Thus, the power load of the heater 40 will vary (e.g., 400 watts, 800 watts, 1200 watts), whereby the heating rate of the heater 40 will vary, depending upon how many heating elements are supplied power. A heater 40 wherein a heating element operates at different power levels to vary heating rate is also possible with, and contemplated by, the present invention.

The controller 48 for each heater 40 determines power requirements based on the readings of the temperatures sensors 68–70 in the different zones 64–66, evaluates available heater-dedicated power when necessary, controls the power load of the respective heater 40 based upon protocol procedures, and broadcasts actual power use to the other controllers 48. Preferably, each controller 48 (or a separate controller) includes independent inputs which automatically shut-off power control in the event of an empty chamber 52 and/or overheating caused by a malfunction of the temperature sensors 68–70, the power manager 44, or other equipment.

In a low water draw situation, a relatively small volume of hot water is removed from the upper zone 66 and a corresponding small volume of supply water is introduced into the lower zone 64. The readings of the sensors 68–70 will indicate that the water in the lower zone 64 is at a relatively low temperature while the other zones 65 and 66 are still at an acceptably hot temperature. In a low draw situation, only a small volume of supply water needs to be heated and a relatively great volume of hot water is still available for discharge. As such, water heating needs can be adequately met by only powering the lower heating element 60 until water within the lower zone 64 reaches an acceptably hot temperature.

If the protocol of the power manger 44 is such that each heater 40 is allocated its fraction of heater-dedicated power (e.g. 400 watts), its heating demands will be met by this power allocation. The controller 48 will broadcast this power load via the network 46 whereby, if necessary, a heater 40 pulling a greater percentage of power will be required to reduce its load. In the illustrated six-heater system 10, a vast number of power allocations are possible with a power budget of 2400 watts and one heater pulling a 400 watt load. (See Table A, below.)

TABLE A

| 400 | idle | idle | idle | idle | idle |
|---|---|---|---|---|---|
| 400 | 400 | idle | idle | idle | idle |
| 400 | 400 | 400 | idle | idle | idle |
| 400 | 400 | 400 | 400 | idle | idle |
| 400 | 400 | 400 | 400 | 400 | idle |
| 400 | 400 | 400 | 400 | 400 | 400 |
| 400 | 800 | idle | idle | idle | idle |
| 400 | 800 | 400 | idle | idle | idle |
| 400 | 800 | 400 | 400 | idle | idle |
| 400 | 800 | 400 | 400 | 400 | idle |
| 400 | 800 | 800 | idle | idle | idle |
| 400 | 800 | 800 | 400 | idle | idle |
| 400 | 1200 | idle | idle | idle | idle |
| 400 | 1200 | 400 | idle | idle | idle |
| 400 | 1200 | 400 | 400 | idle | idle |
| 400 | 1200 | 400 | 400 | 400 | idle |
| 400 | 1200 | 800 | idle | idle | idle |
| 400 | 1200 | 800 | 400 | idle | idle |

In a medium draw situation, a volume of hot water is removed from the upper zone 66 and the middle zone 65, and a corresponding volume of supply water is introduced into the lower zone 64 and the middle zone 65. The readings of the sensors 68–70 will indicate that the water in the lower zone 64 and the middle zone 65 is at a relatively low temperature while the water in the upper zone 66 is still at an acceptably hot temperature.

If the protocol of the power manger 44 is such that each heater 40 is always allocated its fraction of heater-dedicated power (e.g. 400 watts), the middle heating element 61 could be immediately provided with this power load. The controller 48 will broadcast this minimum power usage via the network 46 whereby, if necessary, a heater 40 pulling a greater percentage of power will be required to reduce its load. The controller 48 will also determine whether additional heater-dedicated power is available (e.g., whether other heaters are idling). If additional power is available, the lower heating element 60 will also be provided with this power and the controller 48 will broadcast this to the other controllers 48. In the illustrated six-heater system 10 (with a heater-dedicated power budget of 2400 watts), many power allocations are possible when one heater pulls and 800 watt load. (See Table B, below.)

TABLE B

| 800 | idle | idle | idle | idle | idle |
|---|---|---|---|---|---|
| 800 | 400 | idle | idle | idle | idle |
| 800 | 400 | 400 | idle | idle | idle |
| 800 | 400 | 400 | 400 | idle | idle |
| 800 | 400 | 400 | 400 | 400 | idle |
| 800 | 800 | idle | idle | idle | idle |
| 800 | 800 | 400 | idle | idle | idle |
| 800 | 800 | 400 | 400 | idle | idle |
| 800 | 800 | 800 | idle | idle | idle |

TABLE B-continued

| 800 | 1200 | idle | idle | idle | idle |
|---|---|---|---|---|---|
| 800 | 1200 | 400 | idle | idle | idle |

If heater-dedicated power is not available to supply both heating elements 60 and 61, controller 48 will execute an appropriate heating pattern with the allocated power. For example, the allocated power (e.g., 400 watts) could first be supplied to the middle heating element 61 and, once the middle zone 65 is at an acceptable hot temperature, supplied to the lower heating element 60. Alternatively, the controller 48 could periodically cycle the allocated power between the two heating elements 60 and 61.

In a heavy draw situation, a volume of hot water is removed from all three zones 64–66, and a corresponding volume of supply water is introduced thereinto. The readings of the sensors 68–70 will indicate cold water in all three zones 64–66. In a heavy draw situation, water heating needs are preferably met by powering all three heating elements 60–62 when this much heater-dedicated power is available (e.g., 1200 watts). In the illustrated six-heater system 10, with a heater-dedicated power budget of 2400 watts, several power allocations are possible when one heater pulls a 1200 watt load. (See Table C, below.)

TABLE C

| 1200 | idle | idle | idle | idle | idle |
|---|---|---|---|---|---|
| 1200 | 400 | idle | idle | idle | idle |
| 1200 | 400 | 400 | idle | idle | idle |
| 1200 | 400 | 400 | 400 | idle | idle |
| 1200 | 800 | idle | idle | idle | idle |
| 1200 | 800 | 400 | idle | idle | idle |
| 1200 | 1200 | idle | idle | idle | idle |

If only enough power is available to supply two of the three heating elements (e.g., 800 watts), power could first be supplied to the upper heating element 62 and the middle heating element 61 and then, once either zone 65/66 reaches an acceptable hot temperature, shifted to the lower heating element 60. If only enough power is available to supply power to one heating element (e.g., 400 watts), this power could first be supplied to the upper heating element 62, then to the middle heating element 61, and then to the lower heating element 60 as acceptable hot temperatures are respectively reached. Alternatively, in either case, the allocated power could be periodically cycled between the three heating elements 60–62.

Figure 5:
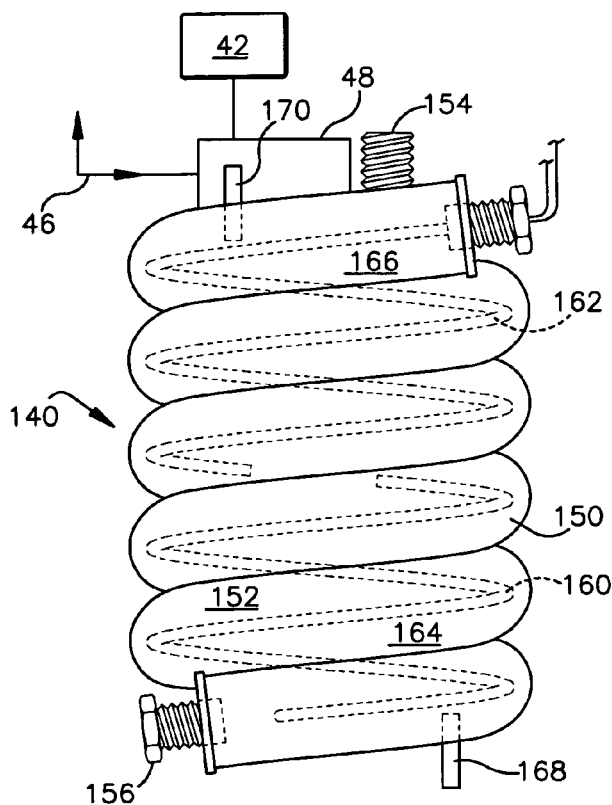
FIG. 5 is a side view of another heater which can be used in the hot water supply system according to the present invention.

Referring now to FIG. 5, a heater 140 which can be used instead of the heaters 40 in the aircraft hot water supply system 10 are shown. The heater 140 comprises a tubular spiral housing 150 (defining a chamber 152 and including an outlet 154 and an inlet 156), and two heating elements 160 and 162. The heating elements 160 and 162 together form a spiral shape which fits coaxially within the tubular housing 150. Specifically, the heating element 160 forms a lower heating element, the heating element 162 forms an upper heating element, and the upper end of the lower heating element 160 is positioned adjacent the lower end of the upper heating element 162. The temperature in a lower zone 164 and an upper zone 166 of the chamber 162 are measured by a sensor 168 and a sensor 170, respectively.

Figure 6:
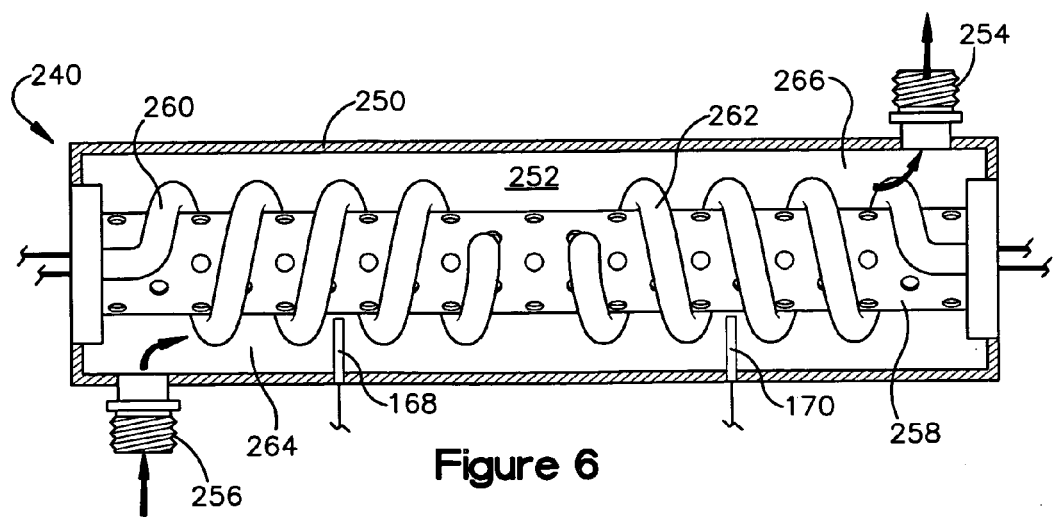
FIG. 6 is a side view of another heater which can be used in the hot water supply system according to the present invention.

As is shown in FIG. 6, a similar heating-element arrangement can be incorporated into a horizontal heater 240 comprising a cylindrical housing 250 (defining a chamber 252 and including an outlet 254 and an inlet 256) having a dispersion tube 258 around which heating elements 260 and 262 are wound. The temperature in an inlet zone 264 and an outlet zone 266 of the chamber 252 are measured by a sensor 268 and a sensor 270, respectively.

In operation of the heater 140/240, power can be provided to one or both of the heating elements 160/260 and 162/262. When power is supplied to both of the heating elements, it can be provided in either electrical series or electrical parallel. Thus, if each heating element is designed for 800 watt operation, the heater 140 can operate at 400 watts when heating elements 160 and 162 powered in electrical series, at 800 watts when one heating element powered, or at 1600 watts when both heating elements powered in electrical parallel. The controller 48 for each heater 140/240 would identify different draw situations based on the readings of the temperatures sensor in the lower/inlet and upper/outlet zones, evaluate available power, determine the optimum heating arrangement for the available power, and execute the most optimum heating arrangement based on available power and protocol. This 400/800/1600 watt heater operation also provides a vast number of power allocations in a six-heater system with a power budget of 2400 watts. (See Table D, below.)

TABLE D

| | | | | | |
|---|---|---|---|---|---|
| 400 | idle | idle | idle | idle | idle |
| 400 | 400 | idle | idle | idle | idle |
| 400 | 400 | 400 | idle | idle | idle |
| 400 | 400 | 400 | 400 | idle | idle |
| 400 | 400 | 400 | 400 | 400 | idle |
| 400 | 400 | 400 | 400 | 400 | 400 |
| 800 | idle | idle | idle | idle | idle |
| 800 | 400 | idle | idle | idle | idle |
| 800 | 400 | 400 | idle | idle | idle |
| 800 | 400 | 400 | 400 | idle | idle |
| 800 | 400 | 400 | 400 | 400 | idle |
| 800 | 800 | idle | idle | idle | idle |
| 800 | 800 | 800 | idle | idle | idle |
| 1600 | idle | idle | idle | idle | idle |
| 1600 | 400 | idle | idle | idle | idle |
| 1600 | 400 | 400 | idle | idle | idle |
| 1600 | 800 | idle | idle | idle | idle |

One may now appreciate that the present invention provides an aircraft hot water supply system 10 wherein a power manager 44 allocates different power levels to different heaters 40 depending upon usage of hot water at the respective water-use stations 14. The present invention allows a vast number of power allocations thereby resulting in a very efficient use of heater-dedicated power and enhancing the performance of the water stations 14.

The invention claimed is:

1. An aircraft hot water supply system comprising:
a group of water-use stations each including a hot water line having a heater which heats water at a heating rate dependent upon power provided thereto; and
a power manager allocating different non-zero percentages of heater-dedicated power to different heaters depending upon substantially real-time conditions at the corresponding water-use stations whereby the heaters will heat the water at different heating rates based upon this allocation.

2. An aircraft hot water supply system as set forth in claim 1, wherein the heater-dedicated power is a predetermined amount of power.

3. An aircraft hot water supply system as set forth in claim 2, wherein the heater-dedicated power is provided from an on-board power source capable of continuously providing this predetermined amount of power.

4. An aircraft hot water supply system as set forth in claim 1, wherein the power manager comprises a network that establishes substantially real-time communication among the plurality of heaters.

5. An aircraft hot water supply system as set forth in claim 4, wherein the network establishes peer-to-peer communication among the plurality of heaters.

6. An aircraft hot water supply system as set forth in claim 1, wherein each heater comprises:
a housing defining a chamber whereat a certain volume of water is heated and stored in anticipation of use at the corresponding water-use station;
an outlet through which hot water exits the chamber upon activation of the water-use station; and
an inlet through which water from the water supply enters the chamber to replace the removed hot water.

7. An aircraft hot water supply system as set forth in claim 6, wherein the power manager evaluates heating needs of the heaters based on the temperature of the water within the chambers of the respective heaters.

8. An aircraft hot water supply system as set forth in claim 6, wherein the power manager includes a controller for each of the plurality of heaters which evaluates power needs of its respective heater based upon water temperature at different zones within the chamber of the heater.

9. An aircraft hot water supply system as set forth in claim 8, wherein the power manager comprises a network that establishes substantially real-time peer-to-peer communication among the controllers.

10. An aircraft hot water supply system as set forth in claim 6 wherein each heater comprises a plurality of heating elements which heat the water within the chamber.

11. An aircraft hot water supply system as set forth in claim 10, wherein power is provided to all or less than all of the heating elements to adjust the heating rate of the heater.

12. An aircraft hot water supply system as set forth in claim 11, wherein each heater comprises at least three heating elements and wherein power can be provided to one heating element for a first heating rate, two heating elements for a second heating rate, and three heating elements for a third heating rate.

13. An aircraft hot water supply system as set forth in claim 11, wherein power can be provided to one of the heating elements for a first heating rate, two of the heating elements in electrical series for a second heating rate, and two of the heating elements in electrical parallel for a third heating rate.

14. An aircraft hot water supply system as set forth in claim 1, wherein each heater is provided with its fraction of the heater-dedicated power regardless of the thermal conditions at the other water-use stations.

15. An aircraft hot water supply system as set forth in claim 1, wherein each heater is provided with a percentage of the heater-dedicated power based on the water draw at the corresponding water-use station.

16. In combination, an aircraft and the aircraft hot water supply system set forth in claim 1.

17. A power manager for an aircraft hot water supply system comprising a group of water-use stations each including a hot water line having a heater which heats water at a heating rate dependent upon power provided thereto; said power manager comprising:
sensors for determining power need requirements of the respective heaters;
a network for communicating determined power needs to the other heaters; and at least one controller for allocating different non-zero percentages of heater-dedicated power to the heaters based upon the sensor-determined and network-communicated power needs.

18. A power manager as set forth in claim 17, wherein each heater includes a controller for allocating different non-zero percentages of heater-dedicated power to its respective heaters based upon the sensor-determined and network-communicated power needs.

19. A power manager as set forth in claim 18, wherein the network establishes substantially real-time peer-to-peer communication among the controllers.

20. A power manager as set forth in claim 17, wherein the sensors are temperature sensors which sense the temperature of the water within the respective heaters.

21. In combination, an aircraft, a hot water supply system comprising a group of water-use stations each including a hot water line having a heater which heats water at a heating rate dependent upon power provided thereto, and the power manager set forth in claim 17.

22. A method of supplying hot water in an aircraft to a group of water-use stations each including a hot water line having a heater; said method comprising the steps of:

using a power manager for, evaluating substantially real-time conditions at each of the water-use stations; and heating the water within the respective heaters at different non-zero heating rates depending upon the conditions at the corresponding water-use stations.

23. A method as set forth in claim 22 wherein said heating step comprises allocating different non-zero percentages of heater-dedicated power to different heaters.

24. A method as set forth in claim 23, further comprising the step of providing the heater-dedicated power from an on-board power source capable of continuously providing a predetermined amount of power.

25. A method as set forth in claim 22, further comprising the step of establishing substantially real-time communication among the heaters.

26. A method as set forth in claim 22, wherein said evaluating step comprises sensing the temperature of the water within the respective heaters.

27. A method as set forth in claim 26, wherein said sensing step comprises sensing temperatures at different zones within a chamber of the heater.

28. A method as set forth in claim 22, wherein said heating step comprises powering a plurality of heating elements of each heater.

* * * * *